Feb. 18, 1969　　A. W. HUBBARD　　3,428,276
AIRBORNE SPRAYING DEVICE
Filed Sept. 25, 1967

INVENTOR
ALBERT W. HUBBARD

By
Cushman, Darby & Cushman
ATTORNEYS

United States Patent Office 3,428,276
Patented Feb. 18, 1969

3,428,276
AIRBORNE SPRAYING DEVICE
Albert W. Hubbard, Langley, British Columbia, Canada, assignor to Okanagan Copter Sprays Ltd., Richmond, British Columbia, Canada
Filed Sept. 25, 1967, Ser. No. 670,149
Claims priority, application Canada, June 6, 1967, 992,320
U.S. Cl. 244—136                    2 Claims
Int. Cl. B64d 1/18; B05b 17/02; A62c 3/02

ABSTRACT OF THE DISCLOSURE

A spraying device adapted for releasable connection to aircraft and in particular to helicopters. The device includes a graduated tank, booms extending outwardly from the tank and having wide angle spray nozzles thereon and a gasoline engine for pumping the spraying liquid from the tank into the booms and out through the nozzles. The engine, pump and other controls are governed from the aircraft through a control cable provided with a pull-out connection for quick detachment.

---

Figure 1:
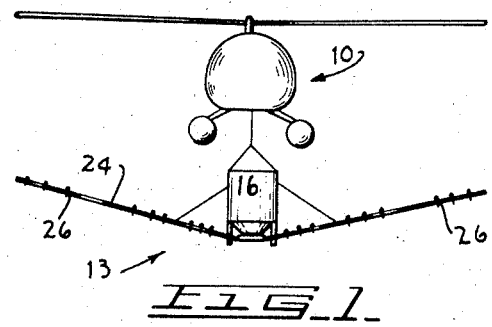

This invention relates to spraying devices and in particular to an airborne spraying device adapted for connection to aircraft such as helicopters. The apparatus is especially adapted for use in the control of insects, plant disease, weed and brush growth, defoliation and forest fire fighting.

Existing airborne spraying devices are at best semi-permanent installations inasmuch as it can take as long as two days to equip an aircraft such as a helicopter for a spraying operation. When performing a spraying operation with known types of airborne apparatus, the aircraft must land and stop its engine while the tanks are being refilled with a chemical or other liquid involved. Even using highly efficient pumping machinery, such refilling takes considerable time. Examples of these known apparatus may be seen from U.S. Patents 3,284,009 of Nov. 8, 1966; 2,659,556 of Nov. 17, 1953 and U.S. Patent 3,204,896 of Sept. 7, 1965.

It will be noted from the above-mentioned patents that most of the known devices have fixed booms extending outwardly from the aircraft so that the pilot cannot deviate from the fixed path of the spraying and consequently he cannot see the area that he has sprayed. The pilot must maintain his craft on a level flight inasmuch as the booms are in effect integral with the aircraft. Moreover, the existing systems usually have tanks situated close to the aircraft such as in U.S. Patent 3,284,009 and this gives rise to contamination problems. For example, when spraying with corrosive liquids the aircraft must be washed down at regular intervals to prevent damage to the framework or other parts of the structure. Also, if known systems are being used in spraying with benzene derivative type sprays, then fire and explosion hazards are always present.

The spraying device of the present invention eliminates numerous disadvantages that are inherent in known systems in that the apparatus described herein may be made ready for spray work in minutes and all that is required of the aircraft is that it have a cargo hook and an electrical supply. In the spraying system used in the present apparatus, a spare tank may be incorporated which reduces the change-over time to seconds and landing of the aircraft is only necessary when fuel for the aircraft itself is required. Moreover, minor adjustments can be made as needed to the spare tank while the aircraft is spraying with another device.

In using the suspended system of the present invention it is possible for the pilot to "crab" and see the area that he is spraying. This results in more efficient application and eliminates the possibility of extensive overlap of sprayed areas.

In accordance with one aspect of the present invention, there is provided a spraying device which is adapted for releasable connection to an aircraft such as a helicopter and the device comprises a container for a liquid to be sprayed, at least one boom which extends outwardly from the container, a pump and means for driving the pump situated intermediate the container and the boom and a plurality of nozzles on the boom for directing the liquid away from the boom.

Figure 2:
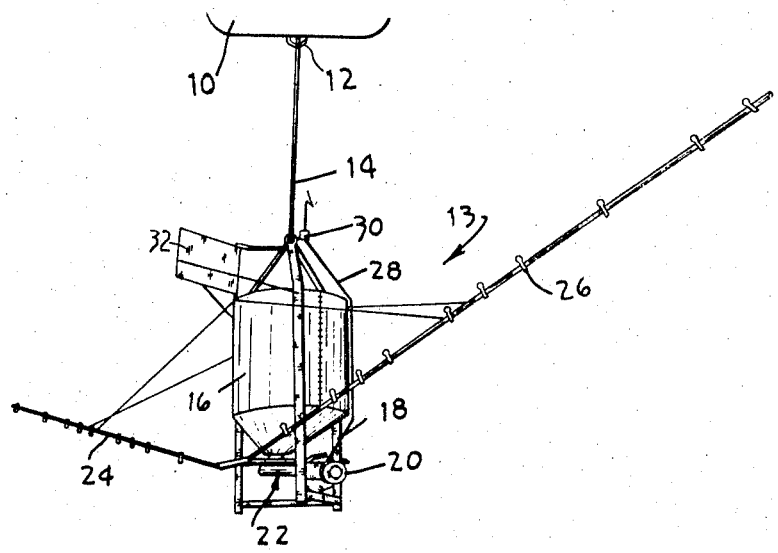

The invention will now be described by way of example with reference to the accompanying drawings in which:

FIGURE 1 is a schematic illustration of an aircraft such as a helicopter carrying the spraying device of the present invention; and FIGURE 2 is a perspective view of the apparatus of the present invention suspended from the lower end of an aircraft.

Referring to the drawings, an aircraft such as a helicopter 10 is provided with a cargo hook 12 and the spraying apparatus generally indicated at 13 is connected to the cargo hook by means of a cable 14. The spraying device 13 includes a container in the form of a graduated tank 16, the latter including a plurality of legs 18 for resting the device on the ground. A platform 20 connected to the leg 18 supports a pump and means for driving it such as a small gasoline engine indicated at 22.

The device is provided with a boom 24 (shown for example in three sections) that is suitably secured to either the tank or the legs 18 and the boom is provided with a plurality of wide angle spraying nozzles 26. Valves for the pump and other such controls are governed by the pilot of the aircraft through a control cable 28 which is provided at its upper end with a pull-out type of connector 30 which can be easily connected or disconnected to another connector from the aircraft 10. Guide means such as a fin 32 may be provided on the spraying device 13 to prevent the latter from rotating or spinning and to provide the device 13 with aerodynamic properties.

In operation, the tank is filled with the required liquid and is hooked onto the helicopter 10 by means of a cargo hook 12. The electrical connection is made by means of the connector 30 and the device is ready for operation. A second tank can be filled and ready for pickup and when the aircraft returns from a spraying sweep it can lower the empty tank onto the ground, hover over the fresh tank, pick it up and be off on another spraying sweep in a matter of seconds.

I claim:
1. A spraying device for aerial operation with a helicopter, said device comprising a container for liquid to be sprayed; nozzle booms in liquid communication with said container and extending radially outwardly from the container so that said booms will assume an operative position substantially normal to a flight path; a plurality of nozzles on said booms for spraying said liquid downwardly away from said booms; motorized pump means on said spraying device for transmitting the fluid from the tank to the nozzles under pressure; a suspension line for hanging said device freely below and remote from a helicopter; an easily released control connection between said spraying device and the helicopter whereby control of spraying can be governed from the helicopter; and a guide fin on the spraying device to render said device aerodynamically stable during flight.

2. A spraying device according to claim 1 wherein said booms extend outwardly well beyond the width of the helicopter fuselage.

References Cited

UNITED STATES PATENTS

| | | | |
|---|---|---|---|
| 1,611,080 | 12/1926 | Rothenberg | 244—136 |
| 2,488,554 | 11/1949 | Otterson | 244—136 |
| 2,665,092 | 1/1954 | Sands | 244—136 |
| 3,220,482 | 11/1965 | Eveleth | 244—136 |

FERGUS S. MIDDLETON, *Primary Examiner.*

J. E. PITTENGER, *Assistant Examiner.*

U.S. Cl. X.R.

169—2; 239—171